United States Patent [19]

Kraw et al.

[11] Patent Number: 4,917,862

[45] Date of Patent: Apr. 17, 1990

[54] FILTER AND METHOD FOR REMOVING MERCURY, BACTERIA, PATHOGENS AND OTHER VAPORS FROM GAS

[76] Inventors: Allan Kraw; Carol A. Kraw, both of 10238 Gelfand Pl., Albuquerque, N. Mex. 87114

[21] Appl. No.: 182,244

[22] Filed: Apr. 15, 1988

[51] Int. Cl.[4] ............................................. A61L 9/00
[52] U.S. Cl. ............................................. 422/4; 55/74; 55/279; 55/316; 55/387; 55/501; 423/210; 423/239; 422/122; 98/104
[58] Field of Search .................... 55/72, 74, 68, 279, 55/316, 387, DIG. 35; 422/4, 122; 423/210, 239; 98/104

[56] References Cited

U.S. PATENT DOCUMENTS

| | | |
|---|---|---|
| 2,611,679 | 9/1952 | Haulenbeek et al. ................. 55/279 |
| 3,019,127 | 1/1962 | Czerwonka et al. .................. 55/524 |
| 3,410,055 | 11/1968 | Zenz ....................................... 55/316 |
| 3,458,130 | 7/1969 | Juhlin .................................... 55/511 |
| 3,509,697 | 5/1970 | Dewey et al. ......................... 55/316 |
| 3,804,942 | 4/1974 | Kato et al. ............................ 55/316 |
| 3,956,458 | 5/1976 | Anderson ................................ 55/72 |
| 4,500,327 | 2/1985 | Nishino et al. ........................ 55/74 |

FOREIGN PATENT DOCUMENTS

| | | | |
|---|---|---|---|
| 1225751 | 3/1971 | United Kingdom ................. 55/316 |
| 1449119 | 9/1976 | United Kingdom ................. 55/316 |

Primary Examiner—Bernard Nozick
Attorney, Agent, or Firm—Lynn E. Cargill

[57] ABSTRACT

A filter for removing mercury and other vapors from air passed therethrough includes at least one container having a plurality of cells, each cell having an inlet and an outlet oriented substantially in the direction of the flow of air passed therethrough. The cells are partially filled with disintegration-resistant activated carbon pellets to permit swirling of the pellets within the cells as air passes therethrough. The filter may also include a pre-filter made up of fibrous materials and a post-filter located downstream from the containers. In addition, a filter assembly for removing elemental and molecular contaminants and air-born bacteria from contaminated air includes a casing with a filter means inside, the cells of the filter means being partially filled with disintegration-resistant activated carbon pellets and at least one germicidal light within the casing for air disinfection as air passes through the casing. Additional filters may be included within the casing for further removal of contaminants.

12 Claims, 3 Drawing Sheets

FIG 2
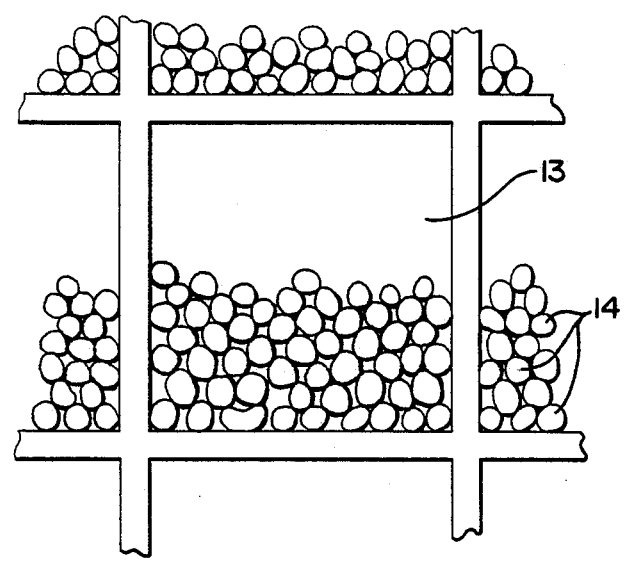
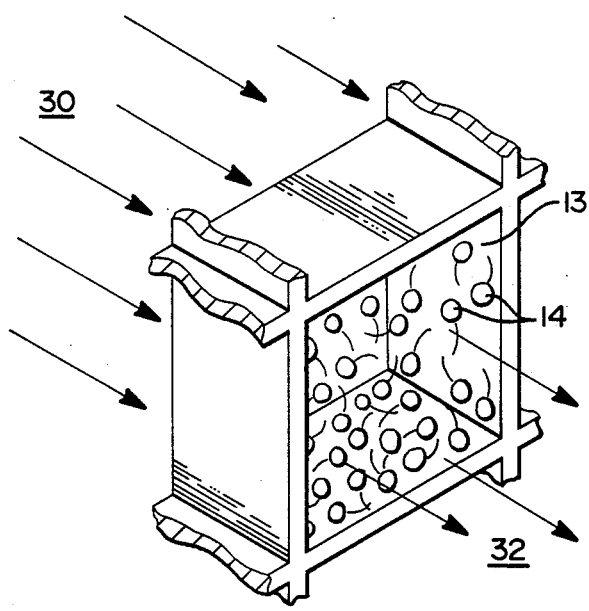
FIG 3

FILTER AND METHOD FOR REMOVING MERCURY, BACTERIA, PATHOGENS AND OTHER VAPORS FROM GAS

TECHNICAL FIELD

This invention relates to filters and methods for removing mercury and other undesirable vapors and contaminants from air and other gases, and more particularly, is concerned with a design and method for removing mercury vapor from atmospheres.

BACKGROUND OF ART

The health care field is experiencing a heightened awareness of problems presented by mercury, nitrous oxide, AIDS, herpes, and many other undesirable contaminants which are found in the work rooms of health care professionals. Sterilization of work tools and work surfaces has heretofore been accomplished by the use of liquid antibacterial soaking and cleaning compounds, as well as various air filtering systems. The air filtering systems were partially effective in removing large molecular weight bacterial antigens, however, they have been unable to remove elemental mercury, nitrous oxide, and ozone, which further have deleterious effects.

The Occupational Safety Health Act of 1970 (OSHA), discloses contamination levels for mercury in the dental profession, and defines "contaminated" as levels that exceed the Threshold Limit Value (TLV) of 0.05 milligrams per cubic meter. Although the effects of mercury poisoning in industrial settings has been documented, the incidents and effects of mercury poisoning in dental offices has only recently been studied. Chronic inhalation of mercury vapor effects primarily the central nervous system, although the kidneys, which accumulates the absorbed mercury, are also effected The symptoms of mercury poisoning from chronic inhalation develop gradually, and thus may be difficult to notice. With the exception of tremors, the symptoms may be ignored by the victim or attributed to other causes This lack of awareness is particularly likely in the case of erethism, a condition characterized by irritability, outbursts of temper, excitability, shyness, resentment of criticism, headache, fatigue, and indecision.

Micromercurialism is said to account for psychological changes observed in persons frequently exposed to low concentrations of mercury in the air, such as concentrations found in the majority of dental offices. Micromercurialism is characterized by decreased productivity, loss of memory, loss of self-confidence, depression, fatigue and irritability.

Mercury vapors in the dental office may pose a serious threat to pregnant dentists, dental assistants, hygienists and receptionists. The primary source of mercury vapor in a dental office is from the practice of hand mulling and squeezing excess mercury from the amalgamation process. In more modern dental offices, high speed amalgamation, using a 1:1 mercury-alloy ratio still results in mercury contamination from spillage, vapors which escape from improper storage, and most notably, the high concentration of mercury vapor in aerosols produced during the removal of old restorations. The high speed drills which are used in this process not only remove the old filling, but also disburse mercury vapor and minute particles into the working environment, and especially spray the contaminated aerosol directly into the face of the dentist, his or her assistant and the hygienist.

In solving the problems related to the used of mercury, recommendations have been made that the dentist provide for a yearly examination for mercury present in the bodies of anyone in the contaminated work space. A further recommendation is for the dentist to have periodic mercury surveys of the work spaces.

Indirect contamination occurs in contemporary dental offices and more modern buildings because there is an increased potential for sustaining unexceptably high concentrations of mercury. Modern dental offices are complete with rugs, return air ventilation systems, amalgamator cabinets, and nearly air-tight ventilation systems in an attempt to be energy conscious.

Rugs or carpeting promote continuing contamination when mercury from a spillage settles into a carpet, because total decontamination is extremely difficult, if not impossible. Vacuuming and walking on the rugs heighten the contamination problem. Vacuum cleaners merely agitate the substances to form mercury vapor, which pass directly through the bag and exhaust and are disbursed throughout different areas of the office.

It has been reported in the ADA Journal that 1 out of 7 dental offices is contaminated to the extent that dental personnel are exposed to hygienally significant amounts of mercury vapor throughout the day. Gronka, et al., *Mercury Vapor Exposure in Dental Offices*, JADA 81;923, Oct. 1970.

Office ventilation systems include return air conduits for heating and cooling which merely recirculate the air. Recirculation helps to lower heating bills, and is included in many modern office buildings. Because dentists tend to have offices in more modern buildings, this problem compounds itself when mercury contamination from a dental office is spread throughout the air ventilation systems in a building to contaminate other offices which share the same building. Contaminated mercury is therefore distributed among the other offices, as well as the dental office itself. These ventilation systems generally include filters for the removal of dust, pollen, and other particulate matters, but do not contain any filtering means for removing elemental mercury or other low weight contaminants. A particle of dust is hundreds of thousands of times larger than the particles of mercury vapor, and are therefore much easier to trap for collection and disposal.

For reasons discussed above, it would be very advantageous to have a means for removing mercury vapor and other toxins, such as nitrous oxide and ozone, as well as pollen, dust and airborne pathogenic bacteria. In the past, filters to be placed in a contaminated room have been commercially available. However, these filters have been very expensive, and require the filter be changed every thirty days. The filter design of the previous systems become easily saturated because very little active area is allowed to come in contact with the contaminated air for removal of the mercury vapor.

In addition, health care professionals are becoming increasingly concerned with the transmission of AIDS, herpes and the air route spreading of pathogenic bacteria in their working environment. Patients are similarly concerned with bacteria left behind by previous patients. It would be advantageous to disinfect and inactivate these viruses, bacteria and infectious diseases by exposing and filtering the air before it reenters the work station or laboratory. Control of the air route of spread of pathogenic bacteria in the operating room was described by Deryl Hart, M.D. and reported in *Review of Surgery*, November-December, 1966, pages 381–392, in which it is stated that bactericidal ultraviolet radiation destroys or attenuates the pathogens which continually enter the air in the environs of human beings. The ultraviolet radiation was found to be effective against many pathogenic fungi and bacteria. Within dental laboratory environs, operations take place which expel bodily fluids containing such bacteria into the atmosphere. Frequent air changes and filtering may be performed in an attempt to reduce the concentration of the contaminants produced during such operations.

U.S. Pat. No. 3,194,629, issued July 13, 1965 to Dreibelbis et al., discloses a process of removing mercury from a gas by passing the gas over activated carbon impregnated with sulfur.

U.S. Pat. No. 3,568,416, issued Mar. 9, 1971 to Staunton, discloses a filter assembly including a honey-comb structure having a plurality of passages therein aligned in the direction of air flow. Some of the passages in the honey-comb structure are filled with granular filter material, such as activated carbon, while the other passages remain unfilled.

U.S. Pat. No. 3,630,007, issued Dec. 28, 1971 to Newmann, discloses a disposable active charcoal filter having a frame open at both sides and subdivided into a plurality of compartments by intersecting partitions. The two open sides are covered by gas permeable sheets, and the space between the sheets is filled with active carbon.

U.S. Pat. No. 3,956,458, issued May 11, 1976 to Anderson, discloses an apparatus for the collection and removal of mercury vapor from the air. Atmospheric air conditioning mercury vapor is forced by a blower through a sulfur filter, through an electrostatic precipitator, and into an iodine impregnated, activated charcoal filter.

U.S. Pat. No. 4,139,354, issued Feb. 13, 1979 to Giles, discloses a small annular-shaped filter specially designed for use in controlled atmosphere working enclosures of the type used in dental operatories and the like for performing mercury handling operations. The filter is removably mounted within the air outlet parts of the work enclosures and contains a filtering material specially developed for mercury vapor from the air passing through the filter.

U.S. Pat. No. 4,419,107, issued Dec. 6, 1983 to Roydhouse, discloses a mercury filter for collecting low concentration mercury vapor and gas. The filter has an absorber having a collecting surface of a material that amalgamates readily with mercury, the surface having a reactive tarnish produced by exposure of the plates to available iodine. The absorber may have spaced collecting members with the gas passing about the collecting members. Optionally, at least one of the collecting members is at a higher electrical potential difference than the remaining member, which potential difference is insufficient for the filter to act as an electrostatic precipitator so as to reduce attraction of dust.

Great Britain Pat. No. 1,225,751, issued to Marshall, discloses a filter for filtering gaseous streams, such as air, to remove radioactive particles or chemical substances from a fluid stream. The filter comprises two or more plies of honey-comb material which is slightly offset relative to one another. The cells in the honey-comb structure plies contain granules of activated carbon.

The objects, features, and advantages of the present invention are readily apparent from the following detailed description of the best modes for carrying out the invention when taken in conjunction with the accompanying drawings.

SUMMARY OF INVENTION

It is an object of the present invention to provide a filter for removing mercury, bacteria, pathogens and other vapors from air passed therethrough, including at least one container having a plurality of cells which are partially filled with disintegration-resistant activated carbon pellets to permit swirling of the pellets within the cells as the air passes therethrough. The filter may further comprise a pre-filter made of a fibrous material and a post-filter also made of a fibrous material impregnated with activated carbon. The filter container may be made of a honeycomb configuration grid, or two or more containers in an offset design. The container may be made of laminated cardboard grids, or any other material designed to lessen disintegration of the particles contained therein. The filter may be adapted to fit standard heating, ventilation and air conditioning (HVAC) systems. The filter may also be adapted to fit air conditioners, or may be fit and be removably attachable from a register for return or exiting air.

The container of the filter may be partially filled from about 30% to about 90% with activated carbon pellets having a high surface area. As air passes through the filter, the pellets swirl to expose substantially all of the surface area to remove contaminants from the air passed therethrough.

The activated carbon pellets may be impregnated with sulfur, iodine, or otherwise treated to maximize the removal of contaminants from the air.

The present invention discloses a filter which will not only collect elemental and molecular contaminants, such as mercury, nitrous oxide and other vapors, but is also effective in killing bacteria and viruses and spores present in the environment.

Another object of the present invention is to provide a method for collecting contaminants including particulates, bacteria, pathogens, mercury and other vapors from contaminated gas. In carrying out this object, the present invention includes a method for flowing the contaminated gas through a filter having at least one container including a plurality of cells partially filled with activated carbon pellets. The flowing of the contaminated gas occurs at such a rate as to permit swirling of the pellets within the container to continuously expose the gas flowing therethrough to the surface of the activated carbon pellets, and to increase the likelihood of the contaminants being removed from the gas. Furthermore, methods in accordance with the present invention include attaching a filter assembly to a heating, ventilating and air conditioning system and flowing contaminated gas therethrough.

It is yet another object of this invention to provide a method for attaching a filter having at least one container including a plurality of cells partially filled with activated carbon pellets to a room register and flowing contaminated gas through the filter.

BRIEF DESCRIPTION OF DRAWINGS

FIG. 2 is an enlarged view of a single cell of the filter assembly;

FIG. 3 is a partial perspective view of a cell with a gas passing therethrough;

BEST MODES FOR CARRYING OUT INVENTION

Figure 1:
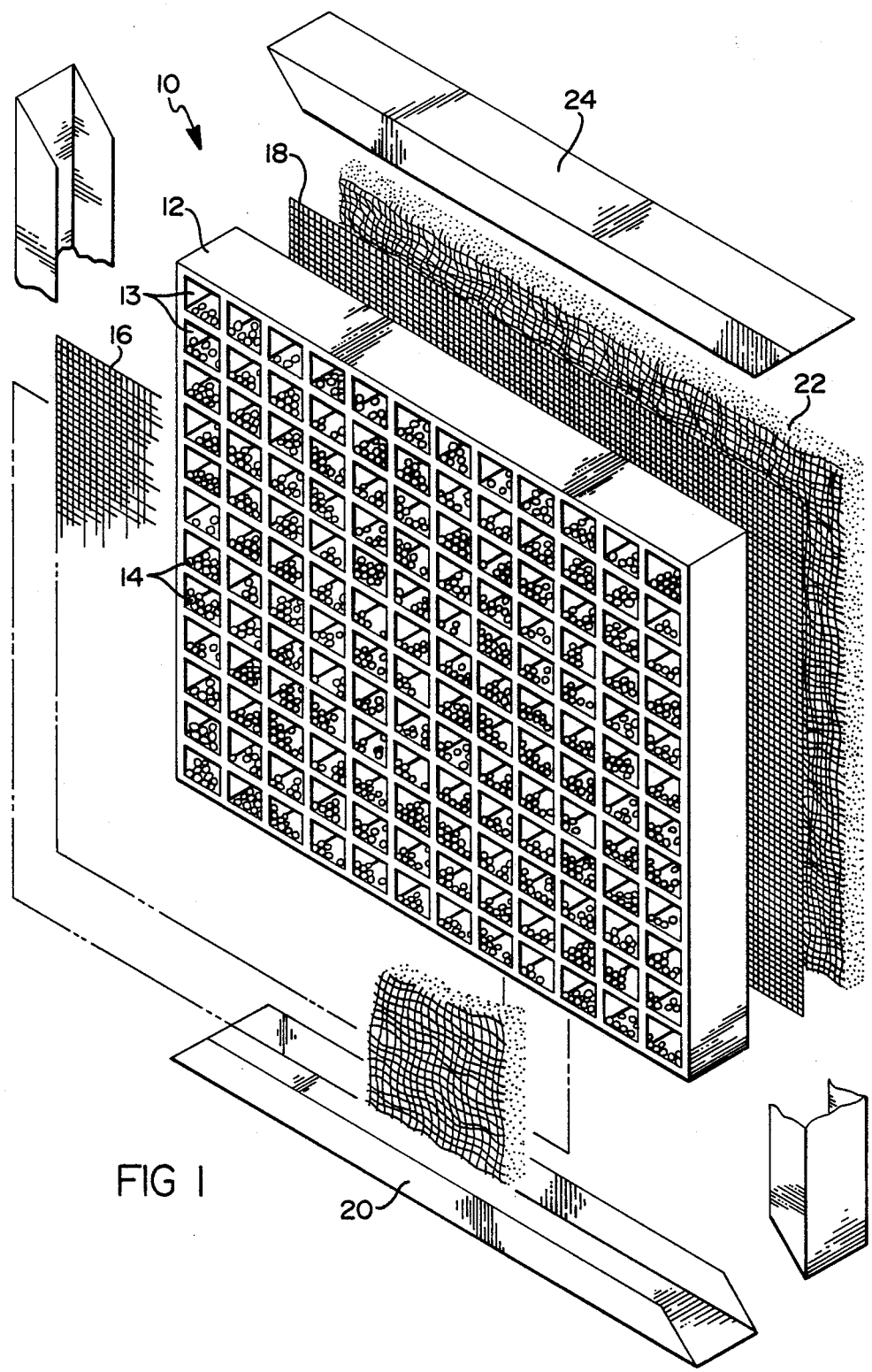
FIG. 1 is a perspective view of a filter assembly including partially filled cells constructed in accordance with the present invention.

Referring to FIG. 1 of the drawings, a filter assembly indicated by reference numeral 10 includes a container 12 which has a plurality of cells 13 containing activated carbon pellets 14. A first screen 16 covers one side of the filter assembly, while a second screen 18 covers the other side to contain the activated carbon pellets 14 while in operation. As is more fully hereinafter described, cells 13 are partially filled with activated carbon pellets 14 to permit movement and swirling therewithin as constructed in accordance with the present invention.

Filter assembly 10 may further include a pre-filter 20 which is made of a fibrous material for collecting particulate matters, and is impregnated with specific activated chemicals for removing mercury and other vapors. Post filter 22 may also be included and may be impregnated with specific activated chemicals for removal of various vapors and particulates. Post filter 22 is preferably also made of a fibrous material, similar to pre-filter 20. Frame 24 encloses all of the elements of the filter assembly and binds them together.

With continuing reference to FIG. 1, the filter assembly 10 is preferably formed of a honey-comb construction, as illustrated. Furthermore, the honey-comb arrangement may take on any orientation, whether horizontal, diagonal or vertical. There may be more than one container 12, and the cells may be oriented in an offset design.

In order to minimize disintegration of the activated carbon pellets 14, container 12 may be made of a laminated cardboard, a soft plastic, or metal or wood having surfaces within the cells 13 to minimize disintegration. Activated carbon pellets 14 are preferably made of a disintegration-resistant, high surface area, activated carbon impregnated with sulfur and iodine. Activated carbon pellets made from coconuts or other disintegration-resistant pellets are preferable, although coal-based pellets may also be used. Even if the pellets disintegrate slightly, fresh active areas are exposed which then act as collectors. The portions of the pellets which fall off are caught by post-filter 22 so that the pieces do not enter the air leaving the filter. In the instance of mercury removal, 50% of the pellets are preferably impregnated with sulfur, while the balance is impregnated with iodine.

A filter assembly 10 constructed in accordance with the present invention may be utilized as a disposable furnace filter in the heating, ventilating and air conditioning system (HVAC) of a dental office. In that regard, frame 24 should be adaptable to fit into a standard size furnace. Other applications include disposable filter assemblies for use in air conditioners, portable, room-sized units, table-top air cleaners, and for use over the registers and cool air returns in individual offices. Smaller versions of the filter assembly can be attached to the register grill for return or exiting air by magnets, velcro, two-sided sticky tape, or any other conventional means of fastening.

It should also be mentioned that filter assembly 10 having activated carbon pellets 14 may include various different types and sizes of pellets, i.e., impregnated with materials other than sulfur or iodine, depending upon the application and the contaminants which are desired to be removed. In the instance of a dental office, there are most notably three molecular contaminants which are desired to be removed, those being mercury vapor, nitrous oxide, and ozone. Sulfur and iodine impregnated pellets have been found to be useful for removal of these contaminants.

Referring now to FIG. 2, a cut away version of a single cell 13 is shown containing approximately 50% by volume of activated carbon pellets 14. In another embodiment of the present invention, cell 13 may be approximately 75% filled. The activated carbon pellets 14 preferably have a very high surface area, a low weight, and are constructed such as to be resistant to disintegration when swirling. HVAC systems force air through the filter at a rate of between 700 and 1200 cubic feet per minute. This speed is sufficient to cause swirling of the pellets therein. Conventional 100% packed filter systems have attempted to pack the pellets tightly so that there is no movement. In addition, conventional honey-comb grids were made of metal having flat surfaces which disintegrate the pellets within the cell. As is hereinafter more fully described, the present invention discloses activated carbon pellets 14 moving within cells 13 during operation.

FIG. 3 is a perspective view of a cell 13 with gas flowing therethrough from an upstream position 30 to a downstream position 32. While FIG. 3 illustrates a simplified filter without the means for containment, activated carbon pellets 14 are shown swirling about within cell 13. Contaminated gas passing from the upstream position 30 at a rate of greater than about 700 cfm agitates pellets 14 making them swirl before the gas moves to downstream position 32. Because pellets 14 are swirling and agitating continuously, this exposes substantially all of the surface area of the pellets to the contaminated gas. In conventional systems, the pellets were fixed, and only the surface of the frontal pellets directly facing the downstream position 32 would have been exposed to the contaminated gas. Consequently, the conventional fixed pellet filter became clogged and less efficient in a relatively short period of time because the front reception sites of the activated carbon quickly become saturated, and the contaminants go around the rear sites and, therefore, are not adsorbed. A filter assembly constructed in accordance with the present invention lasts much longer and requires less replacement because new adsorption sites are being continuously exposed. Considering the cost of some of the conventional filters, a filter which lasts longer and is less expensive would be an advantage to the industry. Furthermore, any dense packed or 100% filled carbon filters will affect operation of blowers in HVAC systems because of the buildup of static pressure.

Referring again to FIG. 3, cell 13 illustrates a partially filled condition. Depending upon the pressure of the gas flowing from the downstream position 32 to upstream position 30, cell 13 may be partially filled from 30% to 90%. Preferably, a filter used in a furnace or other HVAC system is partially filled from 50% to 75%, while a register grill would require a filter assembly having 50% or less fill. Any pellet disintegration is caught by post-filter 22 and will be disposed of along with the rest of the filter.

Figure 4:
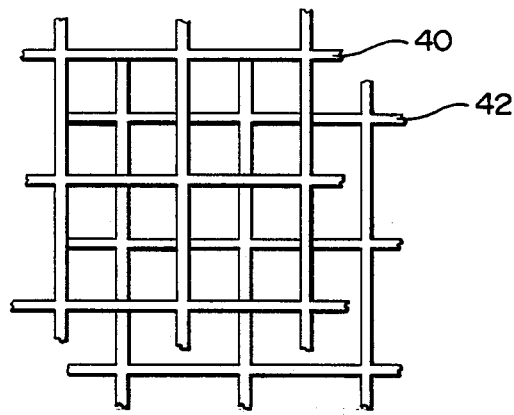
FIG. 4 is a frontal plan view of two containers of a filter in an offset design.
Figure 5:
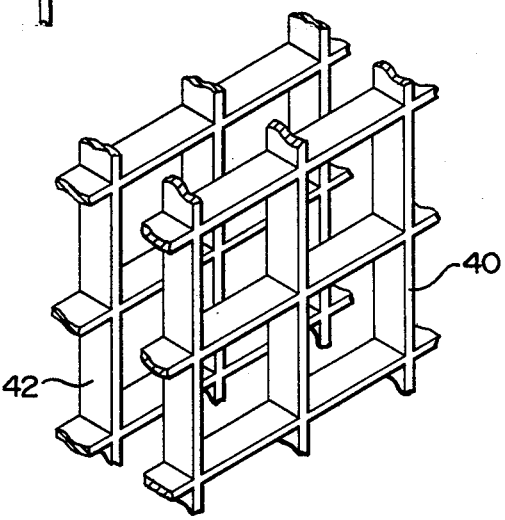
FIG. 5 is perspective view of the two containers of FIG. 4 showing the offset design.

With reference to FIG. 4, two containers 40 and 42 of a filter of this invention are shown in an offset design. FIG. 5 illustrates offset containers 40 and 42 in perspective.

Figure 6:
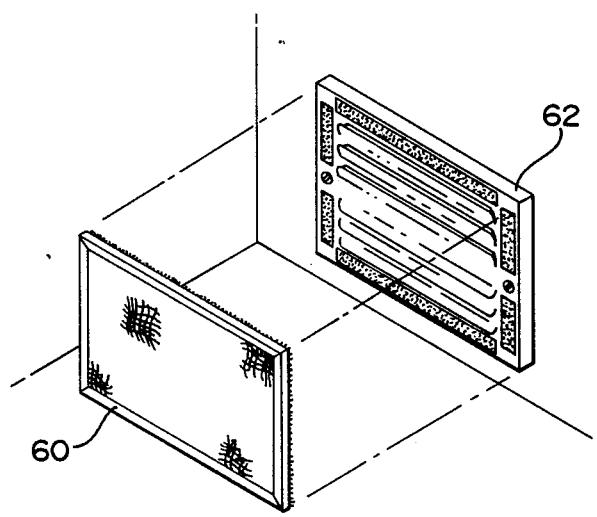
FIG. 6 is a perspective view of a filter of this invention attached to a wall register.

FIG. 6 illustrates a filter 60 of this invention attached to an exiting-air wall register 62. Similarly, filter 60 may be attached to a return-air wall register or an inlet or outlet of a portable or fixed air conditioner.

In the present invention, the filtering treatment may be performed by a method including flowing contaminated gas through a filter as described above having at least one container including a plurality of cells partially filled with activated carbon pellets. The flowing of the contaminated gas occurs at a rate ranging from convection currents to higher speeds of greater than 1200 cubic feet per minute (cfm). Swirling of the activated carbon pellets preferably occurs at rates of flow greater than 700 cfm which continuously exposes the contaminated gas flowing therethrough to the surface of the activated carbon pellets, thereby increasing the likelihood that the contaminants will be removed from the gas.

Further methods for collecting contaminants include attaching a filter assembly as constructed in accordance with the present invention to a HVAC system so that air is circulated through the system, by flowing contaminated gas from an upstream position to a downstream position through the filter. A similar method is disclosed by attaching the filter to a room register in a building so that air entering or exiting the room passes through the filter. Other methods include flowing the contaminated gas through the filter assembly through the partially filled filter and past the germicidal lamps.

While the best modes for carrying out the invention have herein been described in detail, those familiar with the art to which this invention relates will recognize various alternative designs and embodiments for carrying out the invention as defined by the following claims.

What is claimed is:

1. A filter for removing mercury and other vapors from air passed therethrough, comprising:

at least one container having a plurality of cells, each cell having an inlet and an outlet oriented substantially in the direction of the flow of air passed therethrough, said cells being filled from about 30% to about 90% of the cell volume with disintegration-resistant activated carbon pellets having a high surface area, thereby permitting swirling of the pellets within the cells as air passes therethrough;

a pre-filter made of a fibrous material located upstream from the container, said pre-filter being impregnated with activated carbon, and said pre-filter being adapted for removal of particulate material from air passing therethrough;

a post-filter located downstream from the container, said post-filter made of fibrous material being impregnated with activated carbon, and said post-filter being adapted for removal of particulate material from air passing therethrough; and said filter for removing mercury being sized to fit standard heating ventilation and air conditioning systems.

2. The filter of claim 1, wherein said at least one container includes honey-comb configuration type grids.

3. The filter of claim 1, wherein said at least one container includes two or more containers in an offset design.

4. The filter of claim 1 wherein said at least one container includes laminated cardboard grids.

5. The filter of claim 1, wherein said filter is a disposable filter.

6. The filter of claim 1, wherein said filter is adapted to fit an air conditioner.

7. The filter of claim 1, wherein said filter is adapted to fit and be removably detachable from a register for return or exiting air.

8. The filter of claim 1, wherein said filter is adapted to fit portable room air conditioning units.

9. The filter of as in claim 1, wherein said partially filled cells are from about 50% to about 75% filled.

10. The filter of claim 1, wherein said activated carbon pellets are impregnated with sulfur and iodine.

11. The filter as in claim 10, wherein said activated carbon pellets are impregnated with about 50% sulfur and about 50% iodine.

12. A method of collecting contaminants including particulates, bacteria, pathogens, mercury and other vapors from contaminated gas, said method comprising:

attaching a filter assembly to a heating, ventilating and air conditioning system so that air being recirculated through the system flows through the assembly, said filter assembly having at least one container including a plurality of cells partially filled with activated carbon pellets adapted to swirl when gas flows therethrough and at least one germicidal lamp; and flowing contaminated gas from an upstream position to a downstream position though the filter, thereby swirling the pellets contained therein, and eventually exposing substantially all of the surface of the pellets to the contaminated gas to effect removal of the contaminants by the filter.

* * * * *